(12) United States Patent
Capo-Chichi et al.

(10) Patent No.: US 12,382,976 B2
(45) Date of Patent: Aug. 12, 2025

(54) MACERATION COMPOSITION AND METHOD FOR PREPARING SAME

(71) Applicant: SOCIETE DES PRODUITS NESTLE S.A., Vevey (CH)

(72) Inventors: Justine Capo-Chichi, Dijon (FR); Eric Gabriel Marchal, Vittel (FR); Anne-Benoite Prevost, Vittel (FR)

(73) Assignee: Societe des Produits Nestle S.A., Vevey (CH)

( * ) Notice: Subject to any disclaimer, the term of this patent is extended or adjusted under 35 U.S.C. 154(b) by 768 days.

(21) Appl. No.: 17/272,812

(22) PCT Filed: Sep. 2, 2019

(86) PCT No.: PCT/EP2019/073293
§ 371 (c)(1),
(2) Date: Mar. 2, 2021

(87) PCT Pub. No.: WO2020/048898
PCT Pub. Date: Mar. 12, 2020

(65) Prior Publication Data
US 2021/0212344 A1 Jul. 15, 2021

(30) Foreign Application Priority Data
Sep. 3, 2018 (EP) .................................... 18192331

(51) Int. Cl.
*A23L 2/02* (2006.01)
*A23B 70/30* (2025.01)
(Continued)

(52) U.S. Cl.
CPC ................ *A23L 2/02* (2013.01); *A23B 70/30* (2025.01); *A23L 2/60* (2013.01); *A23L 2/68* (2013.01);
(Continued)

(58) Field of Classification Search
CPC .............. A23L 2/68; A23L 27/10; A23L 2/02
See application file for complete search history.

(56) References Cited

U.S. PATENT DOCUMENTS

2005/0226977 A1  10/2005  Bozorgmehr
2010/0092615 A1  4/2010  Olalde Rangel
(Continued)

FOREIGN PATENT DOCUMENTS

EP        3272227 A1    1/2018
KR     20120084422       7/2012
(Continued)

OTHER PUBLICATIONS

Machine translation of KR20120084422, publication date: Jul. 30, 2012. pp. 1-19. (Year: 2012).*
(Continued)

*Primary Examiner* — Jenna A Watts
(74) *Attorney, Agent, or Firm* — K&L Gates LLP

(57) ABSTRACT

The invention concerns a method for preparing a maceration composition made from at least one component selected from the group comprising fruits, vegetables, plants and spices, said method comprising the following steps: •Macerating the component by dipping it into water in order to have the equivalent of 15 to 80 g of component for 1 L of maceration composition, at a temperature of 15° C. to 25° C. for a period of 30 to 120 minutes, thus obtaining a solid material in a maceration; •Separating the maceration from the solid material: •Acidifying the maceration and/or the water to obtain a maceration composition having a pH between 3.1 and 3.5. The invention also relates to a maceration composition obtainable according to this method, wherein said maceration comprises between 20 and 40 g/L
(Continued)

of sugar. The invention eventually relates to a bottled beverage comprising at least one maceration composition according to the invention.

15 Claims, 2 Drawing Sheets

(51) Int. Cl.
*A23L 2/60* (2006.01)
*A23L 2/68* (2006.01)
*A23L 2/72* (2006.01)
*A23L 27/10* (2016.01)

(52) U.S. Cl.
CPC ............... *A23L 2/72* (2013.01); *A23L 27/10* (2016.08); *A23V 2002/00* (2013.01)

(56) References Cited

U.S. PATENT DOCUMENTS

2014/0342043 A1* 11/2014 Bell .................. A23L 2/60 426/72
2015/0315533 A1* 11/2015 Keller .................. C12G 3/022 426/15

FOREIGN PATENT DOCUMENTS

RO 84959 8/1985
WO WO-2016148151 A1 * 9/2016 ............... A23L 2/02

OTHER PUBLICATIONS

Aneja et al. "Emerging preservation techniques for controlling spoilage and pathogenic microorganisms in fruit juices". International Journal of Microbiology, vol. 2014, published Sep. 22, 2014. pp. 1-14. (Year: 2014).*
All Recipes, "Mexican Strawberry Water (Agua de Fresa)". Available as of Mar. 7, 2017 from www.allrecipes.com, pp. 1-2. (Year: 2017).*
Saddozai, et al. "Microbial count and shelf life of strawberry juice". Pakistan J. Agric. Res., vol. 25, No. 3, 2012. pp. 1-6. (Year: 2012).*
Modernist Cuisine, "Keeping it fresh: make your juice last longer". Available as of Jan. 8, 2015 from https://modernistcuisine.com. pp. 1-19. (Year: 2015).*
Wiedemann, "Here's how to macerate strawberries". Available online as of Jul. 20, 2016 from www.refinery29.com, pp. 1-7. (Year: 2016).*
Steen et al., "Carbonated Soft Drinks: Formulation and Manufacture", 2006, pp. 59-63.
"Recipe 19—Lemon Water Soda (Homemade Sprite)", The Homemade Soda Expert, Oct. 17, 2012, 4 Pages.
"Homemade Tonic Water for the Ultimate Gin and Tonic", Pinch and Swirl, Sep. 15, 2017, 52 Pages.
Dias et al., "Electronic Tongue: A Versatile Tool for Mineral and Fruit-Flavored Waters Recognition", Journal of Food Measurement and Characterization, vol. 10, Issue No. 2, 2016, pp. 264-273.
Krieger, "Why Flavored Waters are Bad for Your Teeth", The Washington Post, Apr. 25, 2017, 3 Pages.
Reddy et al., "The PH of Beverages in the United States", The Journal of the American Dental Association, vol. 147, Issue No. 4, 2016, pp. 255-262.
"Volvic Zest Citron", Volvic Zest, Sep. 15, 2017, p. 1.
"Enhanced Water", Wikipedia, Aug. 21, 2018, 4 Pages.
Notice of Opposition Received for Application No. EP19762762.3, mailed on Feb. 14, 2024, 22 Pages of Official Copy.

* cited by examiner

US 12,382,976 B2

MACERATION COMPOSITION AND METHOD FOR PREPARING SAME

CROSS REFERENCE TO RELATED APPLICATIONS

The present application is a National Stage of International Application No. PCT/EP2019/073293, filed on Sep. 2, 2019, which claims priority to European Patent Application No. 18192331.9, filed on Sep. 3, 2018, the entire contents of which are being incorporated herein by reference.

TECHNICAL FIELD

This invention relates to beverages made from fruits or plants or vegetables. This composition relates to a maceration composition of at least one component selected from the group comprising fruits, vegetables, plants and spices, and to the method for preparing same.

BACKGROUND OF THE INVENTION

The consumer is more and more in search of healthy food, having reduced sweetness level while having a pleasant and refreshing taste, and being easily digestible. The consumers are also looking for the most natural products possible in what concerns the base ingredients.

Juice is traditionally a drink made from the extraction or pressing of the natural liquid contained in fruits and vegetables. Juice is usually prepared by mechanically squeezing fruit or vegetable flesh without the application of heat or solvents. After the fruits are picked and washed, the juice is extracted, then filtered and often concentrated in evaporators, which reduce the size of juice by a factor of 5, making it easier to transport and increasing its expiration date. Juices are concentrated by heating under a vacuum to remove water, and then cooling to around 13° C. About two thirds of the water in a juice is removed. Juices are then pasteurized and filled into containers. The juice is then later reconstituted, by mixing the concentrate with water.

Therefore, fruit juices are not considered completely natural products.

Fruit smoothies are popular, remain a healthy food but are generally very sweet.

Scented or flavored waters are very popular with consumers because they are refreshing and perceived as detoxifying. However, when they are flavored with fruit, this is either from fruit juice added in the water or from flavors. Additionally, they need to be consumed in a restricted period when they do not contain preservatives.

Some beverages called fruit maceration or infusion are also known to the consumer. Actually, these beverages comprise plant maceration or infusion, fruit juice and flavorings.

Infusion is a process in which a hot or boiling liquid, for example water, is poured over the herb, or other botanicals (for example leaves, like tea leaves, flowers or berries) which is then allowed to steep in the liquid for a period of time. The cold resulting drink or a beverage is called infusion.

Maceration is a process that allows a solid to remain in a cold liquid to extract the soluble compounds, or to absorb the liquid in order to obtain the perfume or the flavor, to preserve it or for it decomposes there. Maceration can be done in an alcoholic solution (alcoholic maceration), water, brine, or oil. This operation is opposed to the decoction, in which the liquid is kept boiling, and to the infusion in which the liquid is boiled and then cooled. The resulting liquid is also called maceration.

Thus, refreshing beverages such as flavored waters and fruit maceration or infusion still comprise fruit juice and/or flavors, preferably natural flavors, which is not always pleasant to the consumers.

Therefore, there is a need for further improvement in and to processes for preparing flavored water products, wherein the products have a consistently desirable and substantially optimized set of organoleptic properties by providing very specific flavor profile. The present invention fulfills these needs and provides further related advantaged.

SUMMARY OF THE INVENTION

The present inventors have found surprisingly that a maceration method in which the duration, temperature and concentration of the macerated component are controlled, is particularly effective for providing new maceration compositions (liquids) comprising new components having a taste detectable by the consumer.

Accordingly, in a first aspect of the invention, there is provided a method for preparing a maceration composition made from at least one component selected from the group comprising fruits, vegetables, plants and spices, said method comprising the following steps:

Macerating the component by dipping it in water in order to have the equivalent of 15 to 80 g of component for 1 L of maceration composition, at a temperature of 15° C. to 25° C., for a period of 30 to 120 minutes, thus obtaining a solid material in a maceration;

Separating the maceration from the solid material;

Acidifying the maceration and/or the water to obtain a maceration composition having a pH between 3.1 and 3.5.

Preferably, the maceration composition comprises an equivalent of 25 to 50 g of component for 1 L of maceration composition.

Additionally, said separating step comprises at least one of the following steps: decanting step, clarifying step, and filtering step.

The maceration composition may further be subjected to a dilution step.

For both, for the macerating step and the dilution step, the water that is used is selected from the group comprising mineral water, spring water, treated water, and tap water.

During the acidifying step, the maceration and/or the water is acidify with acid citric, malic acid or any other suitable acid.

Furthermore, if needed, the maceration composition is further subjected to a step of mixing with sugar.

Preferably, the component is selected from the group comprising apple, banana, pear, lemon, lime, orange, mandarin, grapefruit, kiwi, passion fruit, mango, pomegranate, papaya, peach, apricot, watermelon, melon, strawberry, blackcurrant, currant, gooseberry, raspberry, blueberry, blackberry, cranberry, cherry, grape, white grape, red grape, hibiscus, elderflower, carrot, sugar beet, fennel, cucumber, ginger, mint, spearmint, peppermint, basil, Marseillais basil, Thai basil, rosemary, fenugreek, verbena, sage, thyme, parsley, chamomile, tarragon, spices, cinnamon, cardamom, saffron, lemongrass, cocoa and vanilla.

In order to avoid the use of preservatives, the maceration composition is further subjected to at least one of the steps of sterilizing and pasteurizing. Alternatively, preservatives may be used in order to increase the shelf life of the maceration composition.

The maceration composition may further be subjected to at least one step of mixing with at least one additive selected from the group comprising natural coloring foodstuff and flavors.

In a second aspect of the invention, there is provided a maceration composition obtainable according to the method of the invention, wherein said maceration comprises between 20 and 40 g/L of sugar.

The use of the component in the form of pieces during the macerating step allows advantageously providing a maceration composition in which the component has kept all his gustative properties.

This maceration composition is new with respect to known products of the prior art such as fruit juices since they contain products having an influence on the taste of the maceration which are not present in the other products, and especially which are not present in fruit juices.

In a third aspect of the invention, there is provided a bottled beverage comprising at least one maceration composition according to the invention.

DETAILED DESCRIPTION OF THE INVENTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention, and do not limit the scope of the invention when taken into consideration with the claims and the following detailed description.

In the present description, the following words are given a definition that should be taken into account when reading and interpreting the description, examples and claims.

As used herein, the following terms have the following meanings.

The term "and/or" in "A and/or B" means "A", or "B", or "A and B".

The term "made from X" means that X is used in the process.

The term "ambient temperature" means 20-25° C.

As used in this specification, the words "comprises", "comprising", and similar words, are not to be interpreted in an exclusive or exhaustive sense. In other words, they are intended to mean "including", but not limited to.

Any reference to prior art documents in this specification is not to be considered an admission that such prior art is widely known or forms part of the common general knowledge in the field.

The method for preparing a maceration according to the invention can consist in the steps of macerating and separating. However, the method preferably comprises other steps such as explained below.

Preferably the macerating step is carried out at ambient temperature. The macerating step leads to a solution where the liquid (water, generally colored and translucent) and the solid (component which has been able to fall apart and decompose over time) are mixed.

The component used for the macerating step can be frozen. Typically, the component has been post-harvest frozen (as the method "IQF, Instant Quick Frozen", in which the component is frozen within 3 to 4 hours after harvest).

In such a case the component is generally thawed, preferably at ambient temperature, before the macerating step.

It can also be envisaged that the component used for the macerating step can be lyophilized.

Preferably the water used for the macerating step is selected from the group comprising mineral water, spring water and treated water. Even tap water could be used.

Depending on its nature, the component is generally cut into pieces, pieces whose largest dimension is generally of the order of a few centimeters. The skilled person is able to choose the size of the pieces of the component depending on its very nature.

The component is preferably of organic origin.

The separating step preferably comprises at least one of the following steps: decanting step, clarifying step, and filtering step.

As it is known to the skilled person, the decanting step consists usually in the separation of the liquid and the solid. by allowing gravity to pull the solid fragments to settle at the bottom of a container, typically a few hours at ambient temperature. A centrifuge may also be used, forcing the solid to precipitate to the bottom of the container. For example, the centrifuge is an apparatus Rotor SH-3000 swinging, used with a speed of 500 rpm, used at 20° C. for 20 minutes.

As it is known to the skilled person, the clarifying step consists usually in the separation of a liquid and a solid, particularly when the solid is cut into small pieces (pieces whose largest dimension is generally of the order of a few millimeters), in order to come to a clear liquid. The clarifying step may use for example a filtration process, a centrifugation process or an enzymatic process making use of enzymes. Usual enzymes used in clarification processes are pectinase, cellulase, hemicellulase or glycosidase. One or more of these enzymes may be added in the solution, typically a few hours at ambient temperature.

As it is known to the skilled person, the filtering step consists usually in the separation of the liquid and the solid, by the means of a filter, typically a few hours at ambient temperature. The filter can be a strainer or sieve whose perforation size is chosen by the skilled person in view of the component.

According to the invention, the claimed method makes use of an acidifying step. The acid used in the acidifying step can be citric acid, malic acid or any suitable acid.

A step of mixing the maceration composition with sugar may be needed. The addition of sugar may be made such that the final maceration composition comprises between 20 and 40 g/L of sugar.

Preferably according to the invention, the maceration composition is further subjected to at least one of the steps of sterilizing and pasteurizing.

As it is known to the skilled person, the sterilizing step is typically carried out at a temperature of around 110° C. during 20 to 40 s, e.g. 30 s. It leads to eliminate the *Thermophilus Acidophilus* Bacteries (or TAB).

As it is known to the skilled person, the pasteurizing step is usually carried out at 85° C. to 95° C., e.g. 88° C. or 92° C., for 20 to 50 s, e.g. 30 s or 40 s.

Preferably, according to the invention, the maceration composition is further subjected to at least one diluting step with water selected from the group comprising mineral water, spring water, treated water and tap water. The dilution ratio is calculated to have the required component equivalent amount in 1 L of maceration composition.

This is particularly the case when the macerating step is carried out in two series, the first series leading to a maceration that will be considered as "strong" maceration (or concentrated maceration) by the consumer. The strong maceration will need, according to the taste of the consumer, to be further diluted in order that that the taste of the final maceration composition, to be bottled, is acceptable to the consumer.

This can be also the case when, for logistical reasons, it is desired to proceed with the realization of the final maceration composition in two different locations for example. The diluting step but also potentially step(s) of mixing with sugar and/or acid, as well as steps of sterilizing and/or pasteurizing may be performed in another location than the one in which the strong maceration has been produced.

Mineral water such as Vittel® Grande Source is usually water that comes out of the ground naturally and is considered healthy to drink. Spring water is usually water that comes from a natural spring. Both mineral water and spring water generally contains dissolved mineral salts or gases, usually having medicinal properties. A mineral water is coming from unique source whereas a spring water may come from several springs. For example Vittel® is a mineral water whereas Cristaline® is a spring water. Treated water is generally a water that is processed where in a proposed example minerals are added to a reverse osmosis water such as Nestlé Pure Life® or "Vittel water which is "Vittel Grand Source" whose pH has been settled to 3.9.

More specifically, the component is generally selected from the group comprising apple, banana, pear, lemon, lime, orange, mandarin, grapefruit, kiwi, passion fruit, mango, pomegranate, papaya, peach, apricot, watermelon, melon, strawberry, blackcurrant, currant, gooseberry, raspberry, blueberry, blackberry, cranberry, cherry, grape (including white grape and red grape), hibiscus, elderflower, carrot, sugar beet, fennel, cucumber, ginger, mint (including spearmint and peppermint), basil (including Thai basil and Marseillais basil), rosemary, fenugreek, verbena, sage, thyme, parsley, chamomile, tarragon, and spices (including cinnamon, cardamom, saffron, lemongrass, cocoa and vanilla).

According to the invention, the component is generally selected from the group comprising apple, banana, lemon, lime, orange, mandarin, grapefruit, mango, pomegranate, peach, strawberry, blackcurrant, raspberry, blueberry, cherry, white grape, red grape, elderflower, peppermint, spearmint, Marseillais basil, Thai basil, cinnamon, cardamom, saffron, lemongrass, cocoa and vanilla.

Ain a preferred embodiment, the bottled beverage of the invention comprises two maceration compositions of the invention. For example, it comprises one mixture selected from the group comprising lemon and raspberry macerations, orange and lemon macerations, Thai basil and orange macerations, lemon and mint macerations, or raspberry and blackcurrant macerations.

Although this is not a preferred embodiment, the maceration composition can further be subjected to at least one step of mixing with at least one additive selected from the group comprising natural coloring foodstuff and preservatives. This additive is generally in small quantity in the maceration. The natural coloring foodstuff can be fruit and/or vegetable juices.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The advantages, nature, and various additional features of the invention will appear more fully upon consideration of the illustrative experiments now to be described in detail in connection with accompanying drawings.

Figure 1:
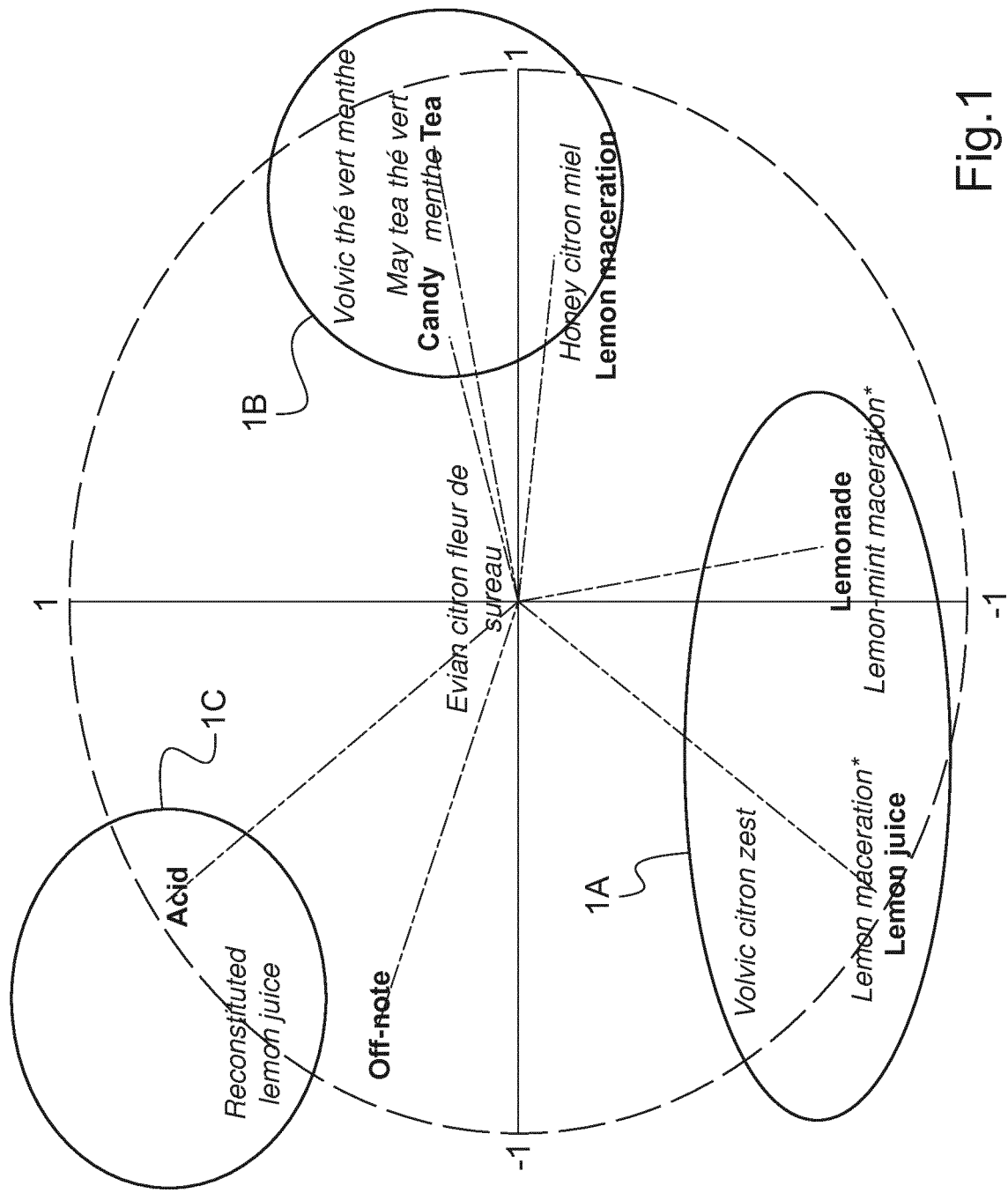
FIG. 1 is a graph plotting the results of the sorting test on the lemon maceration composition and on the lemon-mint maceration composition of the invention.
Figure 2:
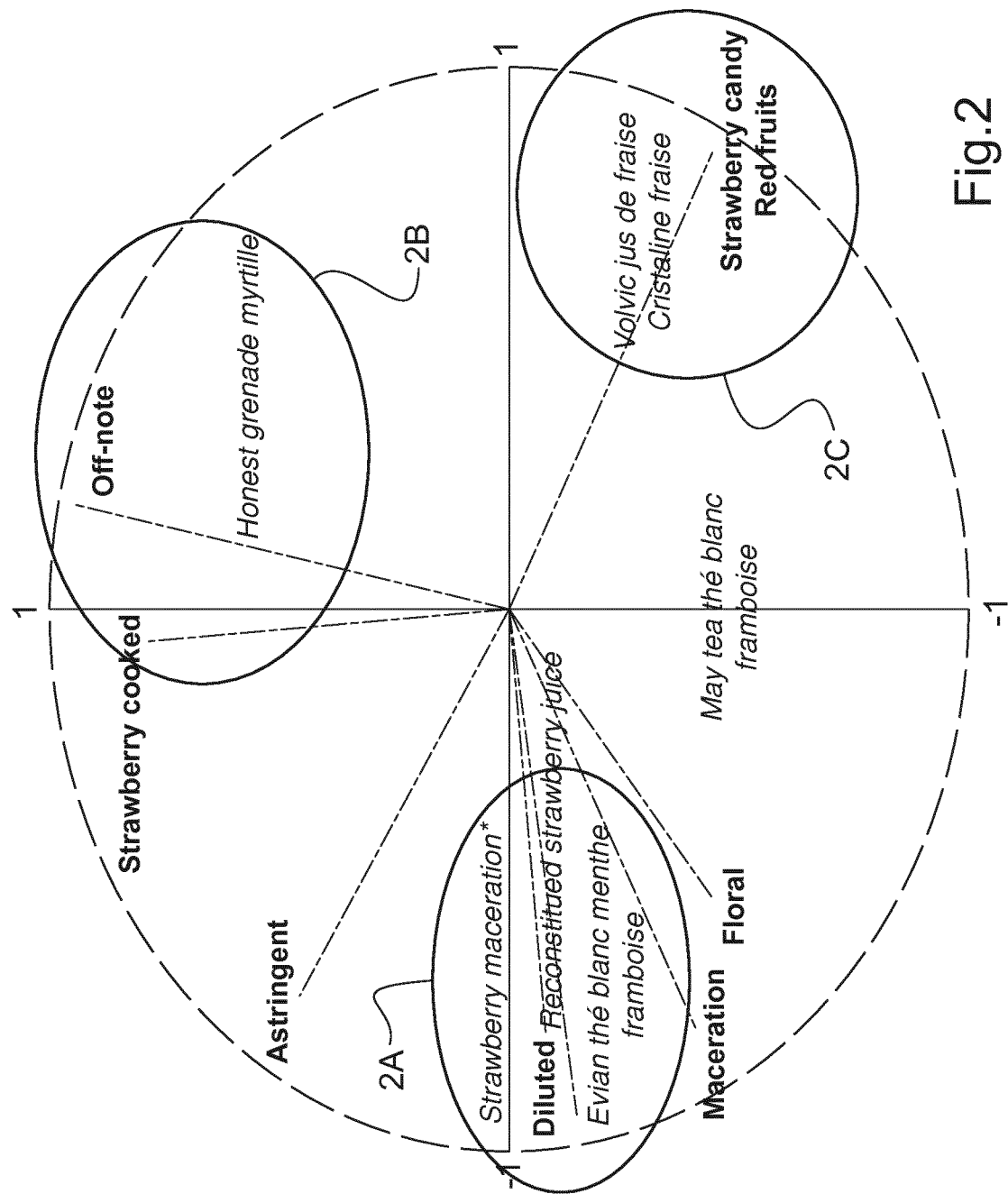
FIG. 2 is a graph plotting the results of the sorting test on the strawberry maceration composition of the invention.

FIGS. 1 and 2 will be described in Example 4 below.

The invention is further described with reference to the following examples. It will be appreciated that the invention as claimed is not intended to be limited in any way by these examples.

Example 1: Preparation of Maceration Composition According to the Invention Using Lyophilized Fruits The preparation of a maceration composition according to the invention using lyophilized fruits was made.

| Name | Quantity g/L |
|---|---|
| Vittel ® Grande Source | Qs 1000 |
| Blackcurrant pieces | 7 |
| Peach pieces | 11 |
| Citric acid | 1.5 |
| Sucrose | 40 |

Dried fruits in a lyophilized form were used.
The fruits were incorporated in the water that was at ambient temperature.
The mixture was kept under mild stirring at ambient temperature (20° C.-25° C.) for 40 to 60 minutes. Then, the product was filtered in order to separate the solid from the liquid. Some citric acid was added so as to have a pH around 3.5.
Some sugar (sucrose) was then added to the composition.

Example 2: Preparation of a Strong Maceration Composition According to the Invention A preparation of a maceration composition according to the invention made by dilution of a strong maceration composition according to the invention was made.
Preparation of the Strong Maceration Composition
  50 g of mixed fruits were added to 50 g of mineral water
  The mixture was stirred up and coverer for 1 hour at ambient temperature.
  Two filtration were made with different filter size.
  A centrifugation (Rotor SH-3000 swinging; 4500 rpm; Acceleration 3; Deceleration 1; T=20° C.; 20 min) of the filtrate was made
  The pH and Brix of the supernatant was measured.
  pH was adjusted to be below 3.5 using citric acid.
  The resulting strong maceration composition was pasteurized (0.1<pvalue<0.12)
Preparation of a Maceration Composition Using the Strong Maceration Composition
  1 to 2 g of citric acid were added to 950 g of Vittel Grande Source
  The strong maceration composition was then added to the mixture
  30 g of powdered sugar were added to form the maceration composition
  The pH and Brix were measured to confirm pH was below 3.5
  The composition was bottled and pasteurized (0.1<pvalue<0.12)

Example 3: Preparation of Three Maceration Compositions According to the Invention Three maceration compositions were prepared according to the invention, respectively made from strawberry, lemon and mint (spearmint) as follows.

The maceration compositions were prepared from frozen organic fruit or plant. The fruits were post-harvest frozen that is to say frozen within 2 to 4 h after harvest (IQF "Instant Quick Frozen" technique). These fruits and plant were thawed just before their use. The thawed fruits were mixed with purified water, in a ratio of approximately 50 g/L. The mixture was kept under mild stirring at ambient temperature (20° C.-25° C.) for 60 minutes. Then, the product was filtered with appropriate filter in order to separate the solid from the liquid. The colored, translucent liquid was mixed with natural mineral water Vittel®. Some citric acid was added so that the pH is around 3.2. Some sugar (saccharide) was then added so that the total sugar content (including the sugar content form the fruit or plant) is around 32 g/L. In a final step the final liquid composition, which is the maceration composition, is rendered aseptic by a treatment at 92° C. for 30 seconds.

Example 4: Organoleptic Properties of the Maceration Compositions According to the Invention Two sorting tests were carried out, under the same conditions, with a panel of 9 panelists who were asked to group several beverages, tasted blindly, according to their dominant taste.

A 2 out of 5 tests were also performed, under the same conditions, with a group of 11 panelists.

These tests were performed for strawberry and lemon maceration compositions prepared in example 3, respectively with respect to reconstituted strawberry juice and reconstituted lemon juice.

4.1. Lemon Maceration Composition of Example 3

The sorting test was carried out on the following commercial products bought in France: "Evian citron fleur de sureau" ("Evian lemon elderberry flower"), "Volvic the vert menthe" ("Volvic green mint tea"), "May tea the vert menthe" ("May Tea green mint tea"), "Honest citron miel" ("Honest honey lemon"), "Volvic citron zest" ("Volvic lemon zest"), on top of the lemon maceration prepared in example 3, a lemon-mint maceration (which is the mixture of the lemon maceration composition of Example 3 and of the mint maceration composition of Example 3) and reconstituted citron juice. All the products are written in italics. The two macerations of the invention are marked by a star "*" in FIG. 1.

The axes of the sorting are representations in two dimension of a multidimensional system. The sorting tests show the situation of the products in view of indicators, written in bold (acid, off-note, lemon juice, lemonade, lemon maceration and candy), all indicators were well-known to the panelists before the test. The sorting test show the position of the product one with respect to the others.

The results of the sorting test are shown in the two-dimension graph of FIG. 1. Three regions are defined, excluding the product "Evian citron fleur de sureau" which is not well represented in this graph since it is characterized by candy and lemonade taste. Each region represents a sensory area. Three sensory areas are clearly disclosed, the first one (1A) comprising the lemon maceration composition and the lemon-mint maceration composition according to the invention, far from the sensory area (1C), which comprises the reconstituted lemon juice, and from the sensory area (1B), which comprises tea products. Reconstituted lemon juice, in sensory area (1C), is perceived more acid and having an off-taste. Products with tea, in sensory area (1B), are clearly perceived as different in term of taste with respect to the other products.

In conclusion, the lemon maceration composition of the invention and the lemon-mint maceration composition of the invention belong to a different sensory area with respect to the reconstituted lemon juice and to the tea products.

A 2 out of 5 (blind) test was performed to check if the lemon maceration composition of the invention and the reconstituted lemon juice were recognized as different from a taste point of view by naïve panelists blindly. For this, 5 blind samples are proposed to the panelists who have to separate in two groups (2 and 3) those which are identical. The answer was that 10 panelists out of 11 found the right answer, meaning that they recognized a difference between the two samples, which is quite significant at 5%.

4.2. Strawberry Maceration Composition of Example 3

The sorting test was carried out on the following commercial products bought in France: "Honest grenade myrtille" ("Honest pomegranate blueberry"), "May tea thé blanc framboise" ("May tea raspberry white tea"), Volvic jus de fraise" ("Volvic strawberry juice"), Cristaline fraise ("Cristaline strawberry"), "Evian thé blanc menthe framboise" ("Evian raspberry mint white tea"), on top of the strawberry maceration composition prepared in Example 1 and reconstituted strawberry juice. All the products are written in italics. The maceration of the invention is marked by a star "*" in FIG. 2.

The axes of the sorting are representations in two dimension of a multidimensional system. The sorting tests shows the situation of the products in view of indicators, written in bold (astringent, strawberry cooked, off-note, strawberry candy, red fruits, floral, maceration and diluted), all indicators well-known to the panelists before the test. The sorting test show the position of the product one with respect to the others.

The results of the sorting test are shown in the two-dimension graph of FIG. 2. Three regions are defined, excluding the product "May tea thé blanc framboise" which is not well represented in this graph. Each region represents a sensory area. Three sensory areas are clearly disclosed, the first one (2A) comprising the strawberry maceration composition according to the invention, far from the sensory area (2B) and from the sensory area (2C). Reconstituted lemon juice, in sensory area (2C), is perceived more diluted.

In conclusion, the strawberry maceration composition of the invention is close to the reconstituted strawberry juice, and significantly far from the other beverages in terms of taste.

A 2 out of 5 (blind) test was performed to check if the strawberry maceration composition of the invention and reconstituted strawberry juice were recognized as different from a taste point of view by naïve panelists blindly. For this, 5 blind samples are proposed to the panelists who have to separate in two groups (2 and 3) those which are identical. The answer was that 10 panelists out of 11 found the right answer, meaning that they recognized a difference between the two samples, which is quite significant at 5%.

The final conclusion of the sensory tests was that the maceration compositions of the invention had significant sensory profiles compared to reconstituted juices and other commercial products.

Example 5: Constituents of the Maceration Compositions According to the Invention The strawberry maceration composition of the invention (Example 3) and the reconstituted strawberry juice were analyzed according to both Liquid Chromatography coupled to High-Resolution Mass Spectrometry (LC-HRMS) and Gas chromatography couple to High Resolution Mass Spectrometry (GC-HRMS). Samples of both products ware analyzed without treatment for GC-HRMS analysis, and diluted by a factor of 100 of LC-HRMS analysis. Samples were analyzed with Head space GC-QExactive to obtain a chemical fingerprint of the compounds present in the samples. Thus, the chemical fingerprints of the samples and the transport blank were compared in order to highlight the unexplained peaks. They were then identified using an international database of more than 250,000 compounds (NIST).

Three compounds were identified by LC-HRMS in strawberry maceration composition samples while they are absent in reconstituted strawberry juices. They are as follows:

| Proposition of identification | Formula | Molecular Weight |
| --- | --- | --- |
| Pinostrobin 5-glucoside | $C_{22}H_{24}O_9$ | 432.1403 |
| Scopoletin | $C_{10}H_8O_4$ | 192.0416 |
| Cyanidin 3-O-[b-D-Xylopyranosyl-(1->2)-[(4-hydroxy-3-methoxycinnamoyl)-(->6)-b-D-glucopyranosyl-(1->6)]-b-D-galactopyranoside] | $C_{42}H_{46}O_{23}$ | 918.2389 |

Several tests were carried out with respect to the origin of the fruits. The results remain the same, which means that these compounds are present in the strawberry maceration composition according to the invention independently of the origin of the fruit.

These compounds are present in the strawberry maceration composition but absent in reconstituted strawberry juices showing a very specific flavor profile of the strawberry maceration composition of the invention.

The invention claimed is:

1. A method for preparing a maceration composition made from at least one component selected from the group consisting of apple, banana, pear, kiwi, passion fruit, mango, pomegranate, papaya, peach, apricot, watermelon, melon, strawberry, blackcurrant, currant, gooseberry, raspberry, blueberry, blackberry, cranberry, cherry, grape, cucumber, vegetables, plants and spices, the method comprising:
   macerating the at least one component by dipping the at least one component into water in order to have the equivalent of 15 to 80 g of the at least one component for 1 L of the maceration composition, at a temperature of 15° C. to 25° C., for a period of 30 to 120 minutes, thus obtaining a solid material in a maceration;
   separating the maceration from the solid material; and
   acidifying the maceration and/or the water to obtain the maceration composition, the maceration composition having a pH between 3.1 and 3.5.

2. The method according to claim 1, wherein the maceration composition comprises an equivalent of 25 to 50 g of the at least one component for 1 L of the maceration composition.

3. The method according to claim 1, wherein the separating comprises at least one of a decanting step, a clarifying step, and a filtering step.

4. The method according to claim 1, further comprising mixing the maceration composition with sugar.

5. The method according to claim 1, further comprising sterilizing and/or pasteurizing the maceration composition.

6. The method according to claim 1, further comprising diluting the maceration composition.

7. The method according to claim 6, wherein the maceration composition is diluted with at least one water selected from the group consisting of mineral water, spring water, treated water, and tap water.

8. The method according to claim 1, wherein during the acidifying, the maceration and/or the water is acidified with citric acid, malic acid or any other suitable acid.

9. The method according to claim 1, further comprising mixing the maceration composition with at least one additive selected from the group consisting of natural coloring foodstuff, preservatives, and natural flavor.

10. The method according to claim 1, wherein in the macerating, the component is introduced into pieces.

11. The method according to claim 1, wherein the at least one component is selected from the group consisting of apple, banana, pear, kiwi, passion fruit, mango, pomegranate, papaya, peach, apricot, watermelon, melon, strawberry, blackcurrant, currant, gooseberry, raspberry, blueberry, blackberry, cranberry, cherry, grape, hibiscus, elderflower, carrot, sugar beet, fennel, cucumber, ginger, mint, basil, rosemary, fenugreek, verbena, sage, thyme, parsley, chamomile, tarragon, and spices.

12. The method according to claim 1, wherein the at least one component is selected from the group consisting of apple, banana, mango, pomegranate, peach, strawberry, blackcurrant, raspberry, blueberry, cherry, white grape, red grape, elderflower, peppermint, spearmint, Marseillais basil, Thai basil, cinnamon, cardamom, saffron, lemongrass, cocoa and vanilla.

13. The method according to claim 1, wherein, for the macerating, the water is selected from the group consisting of mineral water, spring water, treated water, and tap water.

14. The method according to claim 1, wherein the at least one component is selected from the group consisting of apple, banana, pear, kiwi, passion fruit, mango, pomegranate, papaya, peach, apricot, watermelon, melon, strawberry, blackcurrant, currant, gooseberry, raspberry, blueberry, blackberry, cranberry, cherry, grape, hibiscus, elderflower, carrot, sugar beet, fennel, cucumber, ginger, mint, basil, rosemary, fenugreek, verbena, sage, thyme, parsley, chamomile, tarragon, spices, peppermint, spearmint, Marseillais basil, Thai basil, cinnamon, cardamom, saffron, lemongrass, cocoa and vanilla.

15. The method according to claim 1, wherein the at least one component is selected from the group consisting of strawberry, spearmint, and mixtures thereof.

* * * * *